May 24, 1966

E. R. KRETZMER 3,253,234

FREE-RUNNING MULTIVIBRATOR USING A SINGLE CROSS-COUPLING CAPACITOR

Filed May 14, 1962

INVENTOR
E. R. KRETZMER
BY J. P. Kearns
ATTORNEY

United States Patent Office 3,253,234

Patented May 24, 1966

3,253,234

FREE-RUNNING MULTIVIBRATOR USING A SINGLE CROSS-COUPLING CAPACITOR

Ernest R. Kretzmer, New Providence, N.J., assignor to Bell Telephone Laboratories, Incorporated, New York, N.Y., a corporation of New York Filed May 14, 1962, Ser. No. 194,276
6 Claims. (Cl. 331—113)

Figure 1:
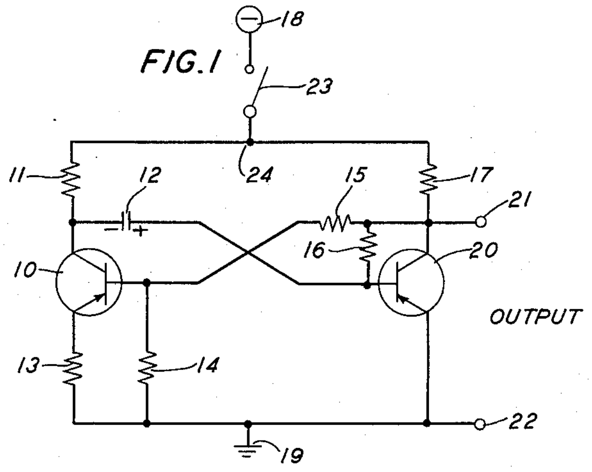

This invention relates to multivibrator circuits of the astable free-running type and more particularly to improved means for accomplishing regeneration therein.

Multivibrator circuits, being relaxation oscillators, are well known in their application as gates, time delay circuits, square wave generators and frequency dividers. Multivibrators are either free-running or driven depending upon whether or not they are provided with a source of synchronizing potential to control the frequency of oscillation. Free-running or astable multivibrators usually comprise at least two translating devices and capacitive circuits for cross-coupling the output of each translating device to the input of the other translating device. In multivibrators of the prior art it is entirely fortuitous as to which translating device turns on first with the initial application of power since the initial instability causing the regenerative switching action may arise in either translating device. This random effect is undesirable in some gating applications when it is desired, for example, that a predetermined time delay precede the actual gating operation after it is called for. For example, a data transmission system has been devised for unattended operation. When one station signals another, an answer-back tone is required to inform the calling station that the called station is ready to receive or transmit data. A multivibrator with one-sided turn-on can be advantageously used to gate the answer-back tone to the transmission line. There is an initial silent period during which the called station completes its preparations for handling the incoming call.

Accordingly, it is an object of this invention to improve multivibrator circuits.

It is another object of this invention to eliminate the uncertainty as to which translating device in a multivibrator circuit first turns on with the application of power.

According to this invention a two-stage transistor amplifier is provided with a positive feedback loop through a single capacitor such that a relaxation oscillator results. Only resistive components are provided otherwise for controlling the bias levels at the several electrodes of the translating devices. These bias levels are set so that the translating devices have quiescent operating points in the linear regions of their characteristics so as to forestall any tendency of either of the translating devices to lock up in the saturated condition and thereby preventing oscillation from starting. The charging time of the single capacitor determines the on-time of one translating device, while its discharging time determines the on-time of the other translating device. One translating device is provided with a degenerative coupling between input and output to prevent saturation effects in the quiescent condition. The other translating device is provided with a degenerative coupling from input to output to prevent complete cut-off in the quiescent condition. Self-starting is thereby assured.

A feature of this invention is the use of a single timing capacitor.

Another feature is positive one-sided turn-on.

A further feature is freedom from lock-up effects because of linear positioning of operating points of the translating elements. In prior art multivibrators it is sometimes found that, due to slow build-up of power supply voltages, for example, both translating elements may initially lock up in the saturated or cut-off states and forestall self-oscillation. This effect is prevented according to this invention by the way in which biasing conditions are established.

Figure 2:
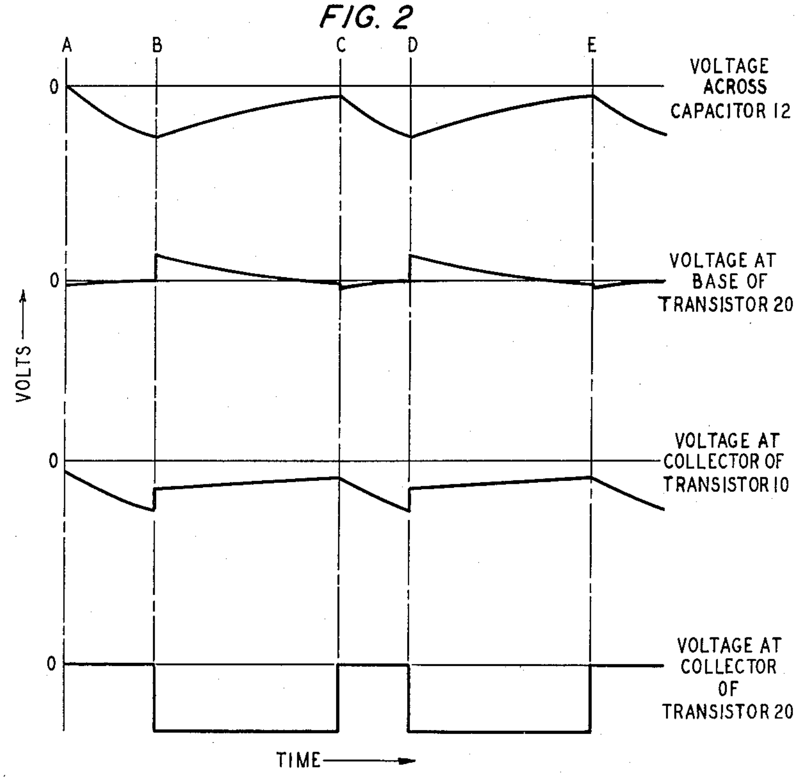

The arrangement and operation of this invention will be apparent from an examination of the following specification and the drawing in which:

FIG. 1 is a schematic circuit diagram of an astable multivibrator embodying the invention; and FIG. 2 is a series of waveforms appearing on an oscilloscope when connected at the points indicated.

A free-running or astable multivibrator of the relaxation oscillator type illustrative of the invention is shown in FIG. 1. The circuit is essentially a two-stage transistor amplifier with the output fed back to the input. The two translating devices are p-n-p junction transistors 10 and 20. Each transistor has emitter, base and collector electrodes affixed in the conventional manner. Load resistors 11 and 17 are connected between point 24 and the collector terminals of transistors 10 and 20, respectively. Resistor 17 forms part of a voltage divider to ground reference point 19 including also resistors 14 and 15. The junction of the latter two resistors goes to the base terminal of transistor 10. In a preferred embodiment the resistance of load 11 is much greater than that of load 17, so that transistor 20 draws a relatively high current when conducting. The emitter terminal of transistor 10 is returned to ground reference point 19 through resistor 13, while the emitter terminal of transistor 20 is returned directly to ground reference point 19. The collector and base terminals of transistor 20 are joined by resistor 16. A positive feedback connection from the collector terminal of transistor 10 to base terminal of transistor 20 is made by capacitor 12. A negative supply source represented by negative terminal 18 is connectable to point 24 by way of single-pole switch 23. The square-wave output is derived across terminals 21 and 22.

It will be understood that an equivalent circuit using n-p-n junction transistors can be constructed. The only change required is the reversal of the supply potential source terminals.

The multivibrator circuit just described operates in the following fashion. Assume that capacitor 12 is out of the circuit, thus opening the feedback loop. The closure of switch 23 applies source potential between points 19 and 24 and across both transistors. Transistor 20 will be partly turned on, short of saturation, by current flowing through load resistor 17 and collector-to-base resistor 16, which is of large magnitude. The voltage from the collector terminal to ground will be a few volts less than the supply potential. Transistor 10 will also be partly turned on by reason of the voltage divider comprising resistors 14 and 15. The values of these resistors are chosen so that the potential at the base terminal of transistor 10 will always exceed cut-off bias. However, due to the degenerative effect of unbypassed emitter resistor 13, transistor 10 cannot draw saturation current regardless of the magnitude of the supply potential or the range the collector potential of transistor 20 can assume.

Both transistors are biased in the active region and have gain. The gain of transistor 10 can be shown by conventional analysis to be approximately equal to the ratio of the value of resistor 11 to that of resistor 13. The gain of transistor 20 is determined in part by the relative magnitude of resistors 16 and 17. The overall gain, depending on the resistance values chosen, can readily be made to exceed unity. Therefore, if the capacitor 12 is inserted to couple the output back to the input as shown in FIG. 1, self-oscillation is assured.

When power is suddenly applied at time A, as indicated in FIG. 2, to the circuit by closing switch 23, transistor 20 will be snapped on without delay and without any regenerative buildup assuming no initial charge on capacitor 12. Transistor 20 draws near-saturation current through its relatively small load resistor and collector potential is substantially at ground reference as shown in FIG. 2 (bottom line). The base potential is slight negative as shown on the second line of FIG. 2. Capacitor 12 will begin charging exponentially in the negative direction through resistor 11 and the base-emitter junction of transistor 20 as shown in the first line of FIG. 2. Base current will correspondingly decrease until time B.

At the same time that transistor 20 is turned on transistor 10 will be held off because no current can flow in resistors 14 and 15 with both ends substantially at ground potential.

At time B the base current of transistor 20 becomes sufficiently small to turn this transistor off, allowing the collector potential to fall toward the supply potential. The base potential of transistor 10 falls correspondingly because of coupling resistor 15. The resultant rise in collector potential of transistor 10 toward ground potential, as shown on line 3 of FIG. 2, is coupled back to the base of transistor 20 through capacitor 12 to raise its potential above cut-off and hold transistor 20 non-conducting. With transistor 10 conducting heavily, the charge on capacitor 12 leaks off principally through resistors 16 and 17 by way of the power supply. Resistor 16 is of large value and the discharge time of capacitor 12 is several times as great as its charging time. This is shown in FIG. 2 between times B and C. At time C the base potential of transistor 20 has fallen slightly negative to the cut-off level and transistor 20 again turns on. The usual feedback action through resistor 15 turns transistor 10 off.

Capacitor 12 again charges through transistor 20. The capacitor has not been fully discharged and therefore the difference between times C and D is shorter than that between A and B. The charge and discharge now become periodic with terminal 21 becoming alternately near ground and supply potential.

Although the embodiment described assumes highly asymmetrical operation the values of the resistors can be established to effect symmetrical operation. The load resistor 17 is chosen small so that a relatively large current can be switched at terminals 21 and 22. The circuit can also be used as a two-terminal network switching between low and high impedance states with points 22 and 24 as output terminals.

The following table presents one set of values for the components of FIG. 1 and the operation of the circuit with these values yielded oscilloscope traces substantially as shown in FIG. 2:

| | | |
|---|---|---|
| Source 18 | volts | −20 |
| Transistors 10 and 20 | Western Electric | 12 G |
| Capacitor 12 | mf | 40 |
| Resistor 11 | kilohms | 19.6 |
| Resistor 13 | do | 1.0 |
| Resistor 14 | do | 1.78 |
| Resistor 15 | do | 31.6 |
| Resistor 16 | do | 178.0 |
| Resistor 17 | do | 1.0 |

The period of oscillation is on the order of 4.6 seconds and is relatively independent of supply potential and transistor characteristics. The initial conducting period of transistor 20 is about 1.2 seconds and the subsequent conducting periods are about 1.0 second.

While the present invention has been illustrated through the medium of a particular illustrative embodiment, many equivalent arrangements will be apparent to those skilled in the art within the spirit and scope of the invention. The component values listed are intended to be illustrative and not by way of limitation on the values that may be used in other applications.

What is claimed is:

1. An astable multivibrator comprising first and second transistor elements, each having base, collector and emitter electrodes, a ground reference point,
a two-terminal source of electrical potential having one terminal returned to said ground reference point,
an unbypassed resistor degeneratively connecting the emitter electrode of said first transistor to said ground reference point,
a direct connection from the emitter electrode of said second transistor to said ground reference point,
a collector load resistor for each transistor to the other terminal of said potential source,
a capacitor coupling the collector of said first transistor to the base of said second transistor,
a resistive connection from the collector of said second transistor to the base of said first transistor,
a further resistive connection between base and collector electrodes of said second transistor,
and a final resistive connection between the base of said first transistor and said ground reference point.

2. An astable circuit including two transistors each having input, output and common connections comprising
a capactive coupling path between the output of one transistor and the input of the other transistor,
a potential source having one terminal grounded,
a first resistor connecting the output connection of said one transistor to the other terminal of said potential source,
a resistive voltage divider connected across said potential source,
a first tapping point toward the other terminal of said source on said divider connected to the output of the other transistor,
a second tapping point on said divider toward the grounded terminal of said source connected to the input of said one transistor,
a second resistor in the common connection to ground of said one transistor such that said one transistor is prevented from drawing initial saturation current,
a direct connection to ground of the common connection of said other transistor,
and a further resistor connected between the input of said other transistor and said first tapping point such that said other transistor is prevented from being completely cut off initially.

3. An unsymmetrical rectangular-wave generator which commences oscillation on the same cycle when energized comprising
first and second amplifying elements having input, output and common circuits,
first and second terminals across which a power source is connectable,
a degenerative feedback resistor in the common circuit of the first amplifying element and connected to said second terminal,
a resistive coupling between the input and output of said second amplifying element to prevent complete cutoff thereof in the starting condition,
a three-part resistive divider connected between said first and second terminals,
a first junction between parts of said divider connected to the output of said second amplifying element,
a second junction between parts of said divider connected to the input of said first amplifying element,
a direct connection of the common circuit of said second amplifying element to said second terminal,
a load resistor connected between the output of said first amplifying element and said first terminal,
a capacitor coupling the output of said first amplifying element to the input of said second amplifying element,
a potential source having one end connected to said second terminal, a switch for connecting the other end of said potential source to said first terminal, the operation of said generator being such that closure of said switch causes said second amplifying element to conduct before said first amplifying element, and an output point for said generator connected to the output of said second amplifying element.

4. A rectangular-wave generator according to claim 3 in which said first and second amplifying elements are junction transistors.

5. A rectangular-wave generator according to claim 3 in which said first and second amplifying elements are p-n-p transistors and said potential source has its positive terminal connected to said second terminal.

6. An astable square wave generator including first and second three-terminal transistor devices and a two-terminal power source comprising input, output and common terminals affixed to each of said transistor devices, a capacitive coupling between the output and input terminals of said first and second transistor devices respectively, a resistive coupling between the output and input terminals of said second and first transistor devices respectively, a resistive connection between the input and the output terminals of said second transistor device, further resistive connections from the output terminals of the respective transistor devices to one terminal of said power source, another resistive connection between the input terminal of said first transistor device and the other terminal of said power source, a direct connection from the common terminal of said second transistor device to the other terminal of said power source, and a degenerative resistive connection from the common terminal of said first transistor device to the other terminal of said power source.

References Cited by the Examiner

UNITED STATES PATENTS 2,968,748 1/1961 Davenport -------- 307—88.5

FOREIGN PATENTS 884,363 12/1961 Great Britain.

ROY LAKE, *Primary Examiner*.

JOHN KOMINSKI, *Examiner*.